Sept. 9, 1947.  G. McCANN  2,427,150
WATER HEATING AND STEAM GENERATING UNIT
Filed Nov. 13, 1944
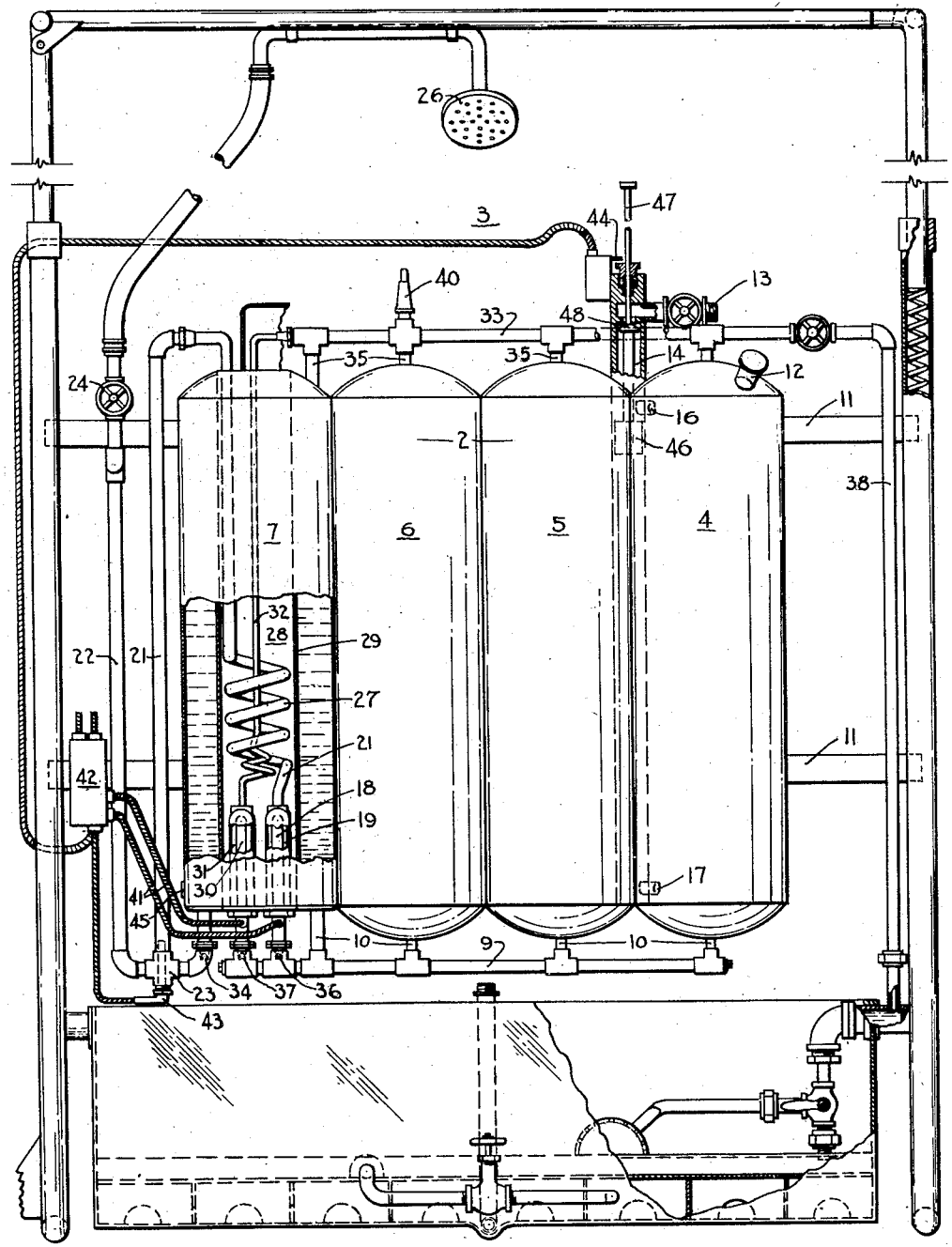
INVENTOR.
GORDON McCANN
BY Gardner & Warren
his attys.

Patented Sept. 9, 1947

2,427,150

UNITED STATES PATENT OFFICE 2,427,150

WATER HEATING AND STEAM GENERATING UNIT

Gordon McCann, Oakland, Calif.

Application November 13, 1944, Serial No. 563,249

4 Claims. (Cl. 122—13)

The invention relates to a means designed for use for supplying water at a desired pressure and temperature, and particularly to a means of this kind which may be incorporated with a shower unit such as disclosed in my co-pending application filed contemporaneously herewith.

An object of the invention is to provide in connection with a tank containing the water to be heated, a means which will heat the water and supply the pressure to circulate the water and raise it above the tank head level, when no pressure potential from a water main or outside source is available.

Another object of the invention is to provide in a water heating and steam generating unit having a water storage tank and without a source of water pressure potential such as a main or water tower, means which will instantly supply a ready, sufficient and constant volume of water to the heating means upon operation of the unit, and which supply will be continuous until the contents of the storage tank are substantially exhausted.

A further object of the present invention is to provide in a water heating and steam generating unit, including a water storage tank, a means which will operate to shut-off automatically the source of heat, irrespective of the water temperature, upon the water in the storage tank receding to a predetermined level.

A still further object of the invention is to provide a water heating unit of the character described in which the heated water will be caused to circulate from the tank to the heating source and thence back to the storage tank if no water is being withdrawn from the unit, but will be discharged directly as heated when the water is withdrawn from the unit.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawing and description may be adopted within the scope of the invention as set forth in the claims.

Referring to said drawing, the figure is a side elevational view of the heating unit of my invention, parts being removed and shown in section in order to show the hidden portions more clearly.

In the drawing I have shown the heating unit 2 of my invention applied to a shower stall 3 such as disclosed in my co-pending application, Serial Number 563,250, filed November 13, 1944, however as will be apparent the present unit may be used for other purposes. As here shown, the unit 2 includes a battery of tanks 4, 5, 6 and 7 supported on cross-members 11 of the stall 3, adapted for the storage of water and connected along the bottom by means of a manifold 9 having branches 10 connected to the said tanks. Water may be supplied to the tanks through a filler spout 12 or by means of a hose (not shown) connected to a suitable source of supply and to a valved pipe 13 leading to a vertical tube 14 which is connected to the tank 4 by means of ducts 16 and 17 adjacent the top and bottom of the tank. Water in the tank is arranged to be heated by means of a suitable source of heat, here conveniently shown in the form of an electric heating element 18, positioned within a vessel 19 inserted within a hot water line 21 connected at one end to the manifold 9 and at the other end to the bottom of one of the tanks. Water may be discharged from the line through a delivery pipe 22 connected to a cross-fitting 23 in the line 21 adjacent the point of connection of the line 21 with the bottom of the tank, the pipe 22 having provided therein a control valve 24 and being connected at its discharge end to the spray nozzle 26 positioned to project a spray downwardly into the shower stall 3.

Preferably the portion of the pipe 21 leading directly from the vessel 19 is in the form of a coil 27, and as here shown the vessel 19 and the coil are positioned within a vertical duct 28 extending through the tank 7 and defined by a tube 29 forming the inner periphery of the tank. With this construction heat radiated by the pipe coil and the vessel may be readily absorbed by the water in the tank 7.

Where, as in the present case, the heating unit is designed for use with a portable shower stall which is not infrequently used where water is not easily available from a source affording sufficient pressure to elevate the heated water to the shower spray head, a suitable source of pressure must be provided for, and accordingly there is incorporated in my unit a means to place the water in the tanks under a pressure, such as by steam, sufficient to provide for the desired pressure potential. Preferably disposed also in the duct 28 is a second vessel 31 which is connected at its lower end to the manifold 9 and at its upper end to a pipe 32 leading to a manifold 33 having branches 35 communicating with the upper part of the respective water tanks. Within the vessel 31 is an electric heating element 30 designed for heating the liquid in the vessel so as to generate steam for discharge through the pipe 32 and into the tanks by way of the manifold 33. The pipe 32 is made of much smaller cross section than the hot water pipe 21 and is formed with a coil portion adjacent the vessel similar to the coil 27 of the pipe 21. This structure permits the water heating and steam generating pipes to be readily employed with other types of heating means, such as open flame burners. As will now be clear, when water is contained within the tanks, water will flow from the manifold 9 into the vessels 19 and 31 wherein it will be heated thereafter passing by connection into the pipe 21, and if not drawn off through pipe 22, will be returned to the tank 7 from whence it may circulate to heat the water in the other tanks through suitable inter tank ducts, not shown, or through the pipes and connections 9, 10, 33 and 35. Desirably, a check-valve 34 is provided in the pipe 21 adjacent the bottom of tank 7 so that when the valve 24 is closed, the hot water may be delivered into the bottom of the tank 7 but will be prevented from flowing back. At the same time the water is being heated in pipe 21, steam is being generated in pipe 32, and by way of the manifold 33, it is conveyed to the tanks and expands to fill the space above the water therein, and thereby provides the pressure necessary for producing in the tanks to the desired hydrostatic head. As a means of preventing excessive steam pressure in the tank, a relief valve 40 is provided in manifold 33. An additional safety measure in the form of a fusible plug 45 in the tank 7 is desirably included, to prevent rupture of the tanks under abnormally high temperatures or pressures. Check valves 36 and 37 are provided in the manifold connection immediately under the vessels 19 and 31, in order to prevent backflow into the manifold.

Preferably and as here shown a pipe 38 is attached to the steam manifold 33 and is extended to the tray 39 of the stall so as to provide a steam distribution point whenever it is desired to use the stall for steam bathing.

Elements 18 and 30 are here shown connected by conductors 41 to a relay 42, to which current is supplied in a suitable manner, and to which is connected a thermostat 43, disposed in the hot water pipe line 21, for control of the heating element 18 by means of the water temperature. As will be clear, when the temperature in pipe 21 reaches a predetermined value, the thermostat 43 will serve to disconnect the electrical circuit to heating element 18, and likewise when the temperature of the water drops to a predetermined value, the heating element will be re-energized.

As an added means of control irrespective of water temperature for the heating element 18, and as an automatic off and on switch for element 30, a trip switch 44 is connected in the relay circuit, to energize or de-energize the latter. Within the tube 14 is provided a float 46, having affixed thereto a tipped stem 47 designed to strike and throw the trip switch 44. Upon the water in tube 14 dropping to a predetermined value, the top of the stem 47 will trip switch 44, thereby shutting off all current to the heating elements; and upon raising of the water level the switch will be returned by spring pressure to closed position to condition the heater circuits for re-energization of the elements. It will then be evident that should the valve 24 to the shower head accidentally be left open, the unit will be rendered inoperative upon the water in the tank reaching a dangerously low level, preventing further wastage of the water, and possible damage to the unit. Preferably the stem is provided with a valve 48 which serves to regulate the supply of water to the tanks from the pipe 13 and operates under control of the float 46 to cut off the supply when the tanks are full.

I claim:

1. In a water-heating unit of the character described a hot water storage tank, a hot water pipe line having one end positioned adjacent the bottom of the tank for discharge therefrom and the other end positioned adjacent the bottom of the tank for discharge thereto, an electric immersion heater within said line for heating the water therein, a pressure pipe line having one end positioned adjacent the lower end of said tank for receipt of water therefrom and the other end positioned adjacent the top of said tank for delivery of steam thereto, an electric immersion heater in said pressure pipe for generation of steam therein, means to cut-off the supply of heat to said heating means for said hot water pipe when the temperature of the water therein reaches a predetermined value or when the level of the water in the tank recedes to a predetermined level.

2. In a water heating unit of the character described, a hot water storage tank, a flue tube extending vertically through said tank, a hot water pipe line having a portion positioned within said tube having opposite ends positioned to receive water from and deliver water to said tank at the same end thereof, heating means disposed within said tube to heat the water in said line, a pressure pipe line extending through said tube having an end positioned to receive water from one end of the tank and a delivery end connected to the opposite end of the tank, heating means within the said vertical tube to generate steam in said pressure pipe, and a valve controlled outlet connection in said hot water line intermediate its ends.

3. In a water heating unit of the character described, a hot water storage tank having a passage extending therethrough and sealed from the interior of the tank, a hot water pipe extending through said passage and having an inlet end communicating with the interior of the tank for receiving the water therefrom and an outlet end connected to said tank for delivery of the hot water thereto, valve controlled means connected to said pipe intermediate the ends thereof providing for discharge of the liquid therefrom extraneously of said tank, heating means within said passage for heating the water in said pipe, a second pipe extending through said passage having an inlet connection with said tank and a discharge connection to said tank at the top thereof, heating means in said passage for generating steam in said second pipe, means associated with each of said pipes to permit the water from the tank to be delivered to the pipes and prevented from flowing back therefrom from the inlet ends, means adjacent the tank delivery end of said first pipe to prevent the flow of water from the tank to said delivery end, means operative when the hot water delivered to the tank reaches a predetermined value, to interrupt the supply of heat to said first pipe, and means operative upon the water in the tank receding to a predetermined level to cut off the supply of heat from each of said heating means.

4. In a water-heating unit of the character described, a hot water storage tank, a hot water pipe line having an outlet end positioned at the bottom of the tank for discharge therefrom and an inlet end positioned at the bottom of the tank for discharge thereto, means to heat the water in said line, a pressure pipe line having one end positioned at the lower end of said tank for receipt of water therefrom and the other end positioned at the top of said tank for the delivery of steam thereto, means to generate steam in said pressure pipe, a controllable outlet in said hot water line intermediate its ends and a check valve in the outlet end of said hot water line adjacent the bottom of said tank for control of water flow exclusively thereto.

GORDON McCANN.

REFERENCES CITED

The following references are of record in the file of this patent:

UNITED STATES PATENTS

| Number | Name | Date |
| --- | --- | --- |
| 1,269,053 | Clark et al. | June 11, 1918 |
| 1,568,788 | Williams | Jan. 5, 1926 |
| 1,321,235 | McCann | Nov. 11, 1919 |